July 21, 1936.                R. J. BIVIN ET AL                    2,048,054
                    ATTACHMENT FOR EARTHWORKING DEVICES
                            Filed Oct. 10, 1934
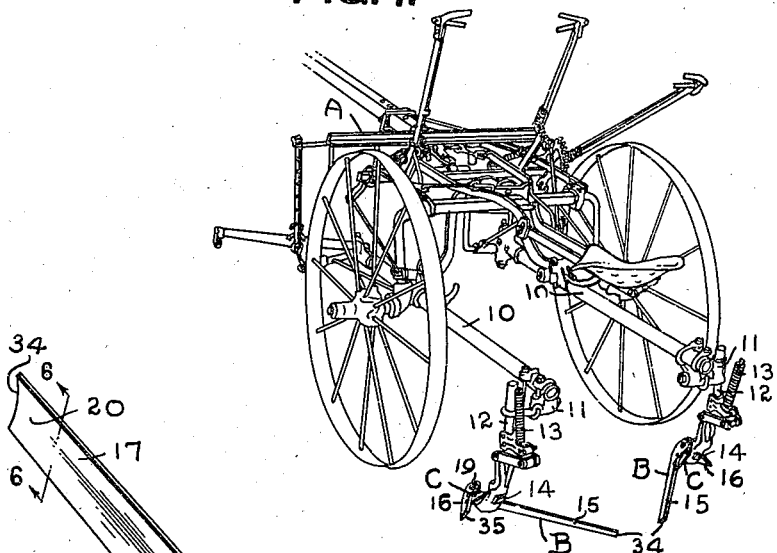
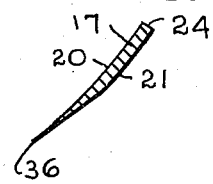
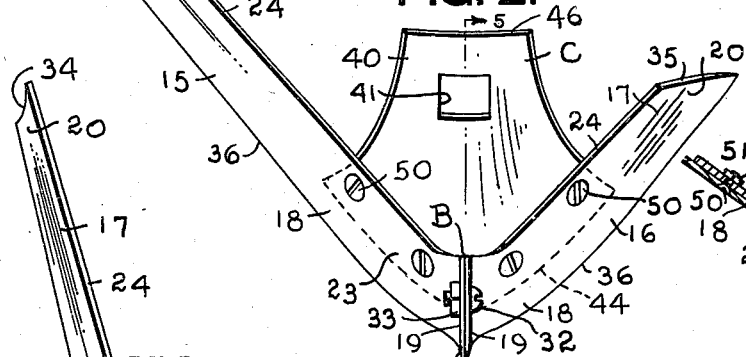
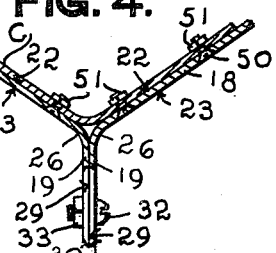
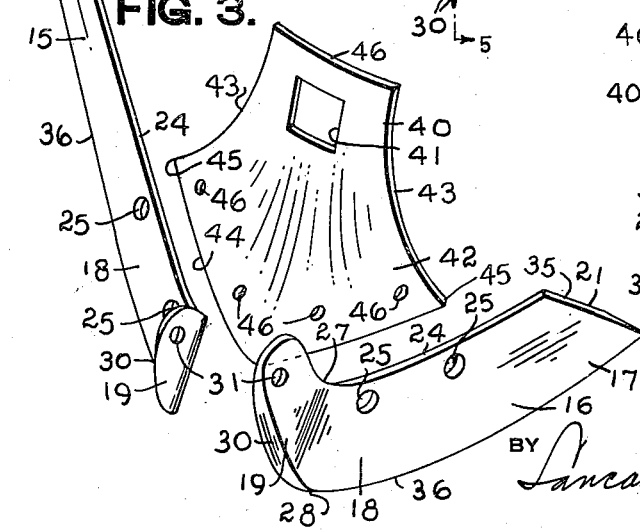
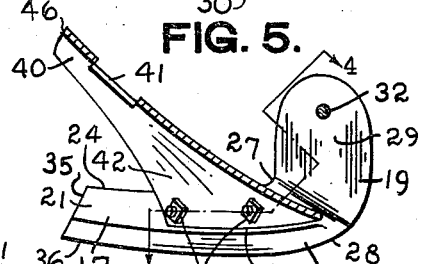
INVENTORS
Robert J. Bivin
Homer M. Houston
BY Lancaster, Allwine & Rommel
ATTORNEYS.

Patented July 21, 1936

2,048,054

UNITED STATES PATENT OFFICE 2,048,054

ATTACHMENT FOR EARTHWORKING DEVICES

Robert James Bivin, Augusta, and Homer M. Houston, Alto, Tex.

Application October 10, 1934, Serial No. 747,790

6 Claims. (Cl. 97—205)

This invention relates to earth working devices, and more particularly to a novel combination sweep and coulter for attachment to cultivators.

The principal object of the invention is to provide a cultivator sweep, a pair of which will take the place of the ordinary gang of shovels associated with cultivators.

Another object is to provide, as a unit, a sweep and a coulter for cultivating.

Still another object is to provide an attachment, as last described, which is easily removed, replaced and adjusted.

Another object is to provide a combination sweep and coulter which will protect from wear the frog to which it is attached.

Another object is to provide a device especially designed to be employed to clean away weed and similar growth, which device will pulverize the soil and will leave a smooth, level surface or a slope, as the user may desire.

Another object is to provide a novel frog, especially adapted for association with the combination coulter and sweep described above.

Other objects and advantages of the invention will be apparent during the course of the following detailed description, taken in connection with the accompanying drawing, forming a part of this specification and in which drawing:—

Figure 1 is a perspective view of a conventional cultivator with a pair of the novel combination sweep and coulter attached.

Figure 2 is a perspective view of the assembled novel device, secured to a frog, but separated from the cultivator.

Figure 3 is a perspective view of the disassembled novel device and frog.

Figures 4, 5 and 6 are sections substantially on their respective lines of Figures 2 and 5.

In the drawing, wherein for the purpose of illustration is shown only a preferred embodiment of the invention and wherein similar reference characters designate corresponding parts throughout the several views, the letter A designates a conventional cultivator, the letter B the novel combination sweep and coulter unit, and the letter C a frog for association with the cultivator A and sweep and coulter unit B.

The cultivator A, shown by way of example, includes a pair of rearwardly projecting beams 10, substantially paralleling each other, each beam 10 carrying, by means of a bracket 11, one or more depending shanks 12, and these may have spring trips 13 associated therewith, each shank 11 being provided with a heel bolt 14, detachably coupling a conventional sweep (not shown) or shovel (not shown) thereto. The shanks 12 are usually rotatable and may be adjusted as to distance from the ground. While a riding cultivator is illustrated, it should be understood that the novel device is applicable to other types of cultivators.

As for the novel combination sweep and coulter unit B, the same preferably includes two body portions 15 and 16, each comprising a rear section 17, a forward section 18 and a coulter section 19. The body portions 15 and 16 preferably differ in length but have features in common.

Each body portion 15 and 16, at its rear section 17, is preferably arcuate in vertical cross section, with the outer faces 20 concave and the inner faces 21 convex. Preferably the convexity of the inner face 21 of the body portion 16 is less than that of the same face of the body portion 15.

Each forward section 18 may show its inner face 22 and outer face 23 substantially straight and substantially paralleling each other. Disposed adjacent the upper edge 24 of each body portion 15 and 16, and at their forward sections 18, may be suitable spaced apart perforations 25 for a purpose later mentioned.

Since the sections 17, 18 and 19 of each body portion are integral, the coulter section 19 of each body portion 15 or 16 extends from the forward section 18 of each body portion in preferably a curve 26, but so that the coulter section 19 forms with the adjoining forward section 18 and rearward section 17 substantially an obtuse angle, as shown, for example, in Figure 4.

It will be noted, particularly in Figures 4 and 5, that the coulter section 19 does not only project forwardly of the other sections mentioned, but also projects upwardly beyond the horizontal plane of the upper edges of the sections 17 and 18. Preferably the coulter sections are curved, as shown in Figure 5, being elliptical, with the edges of the coulter section joining the edges of their respective forward sections 18 of the body portions 15 and 16 in curves, as at 27 and 28.

The inner faces 29 of the coulter sections are preferably substantially flat so that they may be placed in a good face-to-face contact. As for the edges of the coulter sections, these edges are preferably beveled as at 30, the beveled surfaces diverging from the inner faces 29, so that a cutting edge is provided when the two body portions 15 and 16 are joined together with the faces 29 in face-to-face contact.

In no sense, are the coulter sections simply brackets or arms provided to connect the two sweeps together, and they are not brackets nor arms for the purpose of connecting the sweeps to a frog but they combine the function of arms or brackets for connecting the two sweeps together and also the function of a substantial, sturdy coulter. Attention is specifically directed to Figure 5, where it will be seen how the coulter section 19 projects well above the sections 17 and 18.

Each coulter portion 19 is preferably perforated, as at 31, with the perforations aligning axially.

Means, such as a bolt 32 and nut 33 may be employed to connect the two sweeps together with with the shank of the bolt 35 passing through the perforations 31.

Preferably, the rear edge 34 of the section 17 of the body portion 15 slopes from the upper edge 24 toward the forward section 18, so that said upper and said rear edge form an acute angle. Conversely, preferably the rear edge 35 of the section 17 of the body portion 16 slopes from the upper edge 24 of that section away from the forward section 19 of that body portion, so that upper edge 24 and rear edge 35 form an obtuse angle.

In at least one other respect the two body portions 15 and 16 differ, for while the upper edge 24 and lower edge 36, the latter being preferably sharp, of the sections 17 and 18 of the body portion 16 are substantially parallel, the same edges of the body portion 15 converge from substantially the forward end of the section 18 towards the rear edge 34.

As an example, the combined length of the sections 17 and 18 of the body portion 15 are substantially two and one-half to three times the combined length of the sections 17 and 18 of the body portion 16.

The frog C is preferably somewhat fan-shaped, having an upper portion 40 with a slot or opening 41 centered on its vertical medial line. The lower portion 42 of the frog is widened and is bowed, while the preferably concave end edges 43 and preferably convex bottom edge 44 join each other, forming points or projections 45. As a result, a particularly strong and sturdy frog is provided, spreading outwardly where it joins the sweep, so that soil will not be apt to drop over the edge of the sweep adjacent the frog, which is the point where soil is apt to accumulate, and as a consequence, fall over the upper edge of the sweep.

A suitable number of spaced apart perforations 46 are provided above the bottom edge 44, corresponding in number and spacing to the perforations 25 in the body portions 15 and 16. The top edge 46 of the frog is substantially flat, but due to the shape of the body portion 40, is somewhat bowed, as seen in Figure 3.

Suitable means, such as bolts 50 and nuts 51 may be provided to attach the body portions 15 and 16 to the frog C, as is apparent from Figure 4.

When assembled, as shown in Figure 2, the portions B and C may be attached to a suitable earth working device, such as the cultivator A, by loosening the heel bolt 14, and slipping the shank thereof through the slot 41 and tightening up on the bolt. Suitable adjustment of the portions B, one with respect to the other, may now be had by a partial rotation of the shanks 12. Thus, the parts may take the position shown in Figure 1, or the edges 34 of the two body portions 15 may be brought closer to each other or spread farther apart.

Since the sweeps extend below the edge 44 of the frog C, this arrangement and the curved faces 26, aid in protecting the frog C against wear.

The arcuate shape of the section 17 of the body portions 15 and 16 and the shape of their rear edges aid in proper cultivation under modern methods,—such as the laying of an effective mulch in dry sections.

From the foregoing, it is apparent that a sweep and coulter unit has been provided, comprising but two portions, easily assembled or disassembled and relatively inexpensive to manufacture. Breakage of or undue wear on one section does not entail discarding of the entire combination sweep and coulter, since either body portion 15 or 16 may be renewed without discarding the other portion. The one-piece construction of the body portions 15 and 16 renders the manufacture of the novel attachment more inexpensive and at the same time a stronger device is provided.

Various changes may be made to the form of invention herein shown and described, without departing from the spirit of the invention or the scope of the claims.

What is claimed is:

1. In a combination sweep and coulter, two sweeps, each having a forward end and a rearward end, at least one of said sweeps being elongate and having an upwardly and outwardly projecting coulter portion at its forward end, the lateral cross section of said elongate sweep being substantially straight adjacent the coulter portion and the lateral cross section of said elongate sweep being arcuate at its rearward end, and means to secure said sweeps together with a face of said coulter portion in face-to-face contact with a portion of the other of said sweeps.

2. In a combination sweep and coulter, two sweeps, each having a forward end and a rearward end, at least one of said sweeps being elongate and having an upwardly and outwardly projecting coulter portion at its forward end, said coulter being integral therewith, the lateral cross section of said elongate sweep being substantially straight adjacent the coulter portion and the lateral cross section of said elongate sweep being arcuate at its rearward end, and means to secure said sweeps together with a face of said coulter portion in face-to-face contact with a portion of the other of said sweeps.

3. In a combination sweep and coulter, two sweeps, each having a main body portion, a forward end, a rearward end and an upwardly and outwardly projecting coulter portion at its forward end, each of said coulter portions having an inner face and a beveled edge extending in diverging relation from said inner face, and means to secure said sweeps together with said inner faces in face-to-face contact and with said main body portions extending in diverging relation rearwardly of said coulter portion.

4. In a combination sweep and coulter adapted to be associated in pairs with a cultivator, two sweeps each having a main body portion, a forward end, a rearward end and an upwardly and outwardly projecting coulter portion at its forward end, each of said coulter portions having an inner face and a beveled edge extending in diverging relation from said inner face, one of said sweeps being substantially longer than the other and being tapered in width towards its rear end, and means to secure said sweeps together with said inner faces in face-to-face contact and with said main body portions extending in diverging relation rearwardly of said coulter portion.

5. As an article of manufacture, a sweep of the class described and adapted to be attached to and to overlap a portion of a frog, comprising an elongate main body portion having a coulter section extending upwardly therefrom above the upper edge of said main body portion for a substantial distance and disposed in obtuse angular relation with said main body portion, the juncture of said portion with said section being a curve, whereby plowed material will be directed along said main body portion and away from said frog, and the forward edge of said coulter section being beveled.

6. An earth working implement comprising a laterally bowed frog providing a pair of converging surfaces along its lower margin, a pair of sweeps, each sweep being secured to a different one of said surfaces, each sweep being provided with an upwardly extending coulter portion, said sweeps being secured together and in face to face contact at said coulter portions.

ROBERT JAMES BIVIN.
HOMER M. HOUSTON.